C. G. SICKELS.
DEVICE FOR TEACHING SWIMMING.
APPLICATION FILED NOV. 4, 1909.
964,886.
Patented July 19, 1910.
3 SHEETS—SHEET 1.
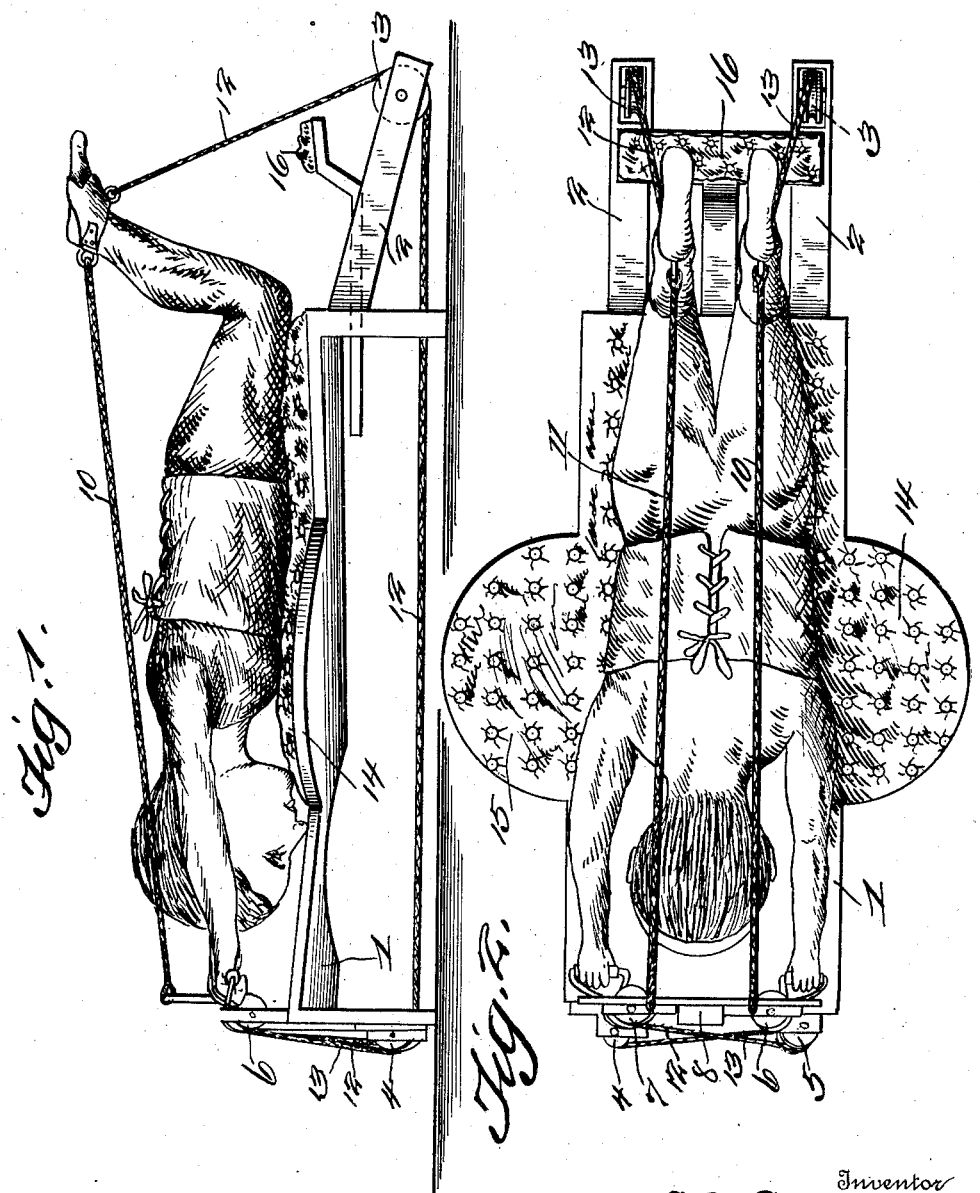

C. G. SICKELS.
DEVICE FOR TEACHING SWIMMING.
APPLICATION FILED NOV. 4, 1909.

964,886.

Patented July 19, 1910.

3 SHEETS—SHEET 2.

Witnesses
Francis W. Boswell
M. W. Miller

Inventor
C. G. Sickels.
By D. Swift & Co.
Attorneys

C. G. SICKELS.
DEVICE FOR TEACHING SWIMMING.
APPLICATION FILED NOV. 4, 1909.
964,886.
Patented July 19, 1910.
3 SHEETS—SHEET 3.
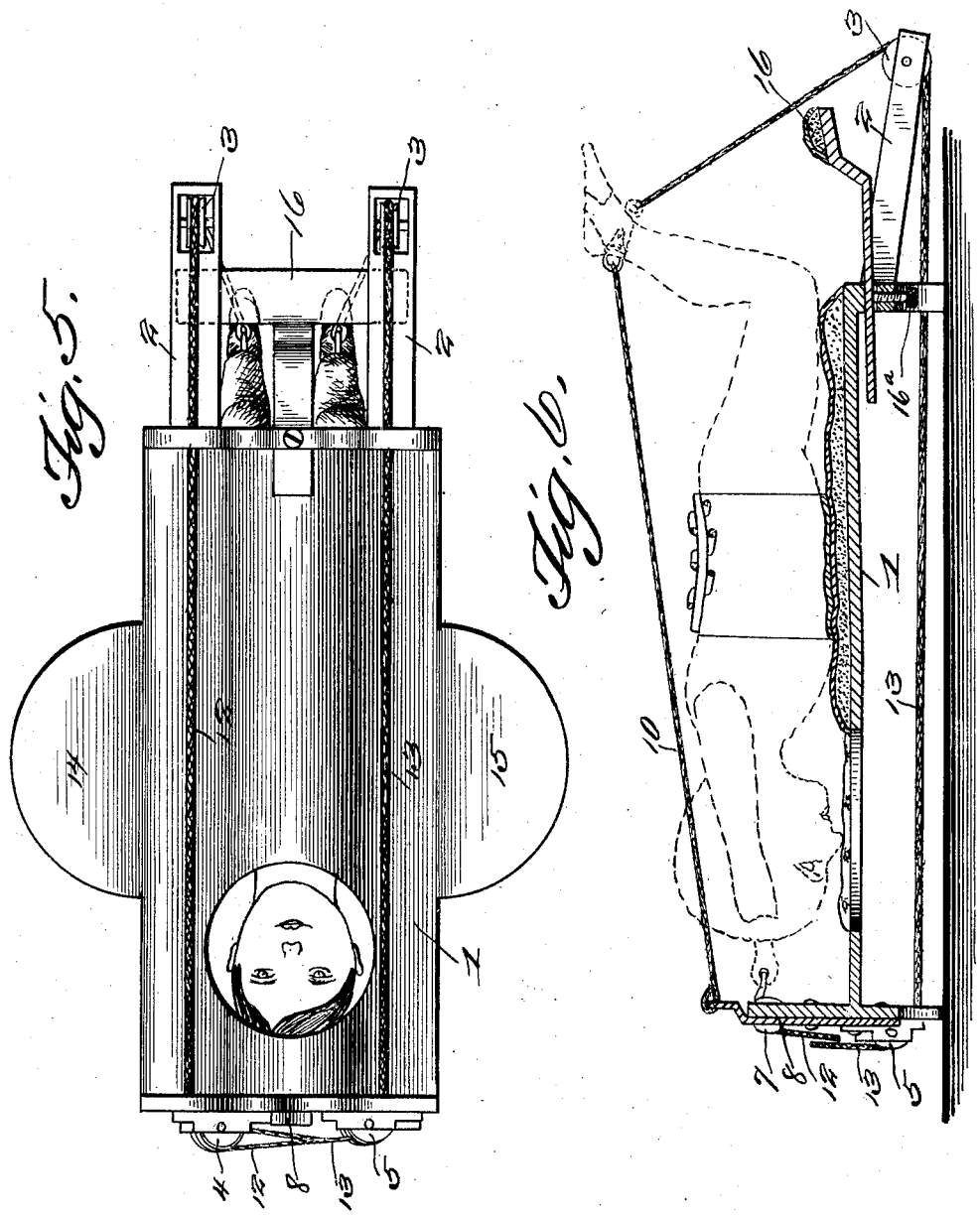
Witnesses
Francis G. Boswell
M. M. Miller.
Inventor
C. G. Sickels,
By D. Swift & Co.
Attorneys

UNITED STATES PATENT OFFICE.

CHARLES G. SICKELS, OF SEABRIGHT, CALIFORNIA.

DEVICE FOR TEACHING SWIMMING.

964,886. Specification of Letters Patent. Patented July 19, 1910.

Application filed November 4, 1909. Serial No. 526,287.

*To all whom it may concern:*

Be it known that I, CHARLES G. SICKELS, a citizen of the United States, residing at Seabright, in the county of Santa Cruz and State of California, have invented a new and useful Device for Teaching Swimming; and I do hereby declare the following to be a full, clear, and exact description of the invention, such as will enable others skilled in the art to which it appertains to make and use the same.

The invention relates to a device for teaching swimming and has for its object to provide a novel device of this character which is designed for the purpose of teaching one the strokes and movements necessary for one to swim with ease.

A further object of the invention is to provide a device of this character which is designed to be used on land and not in the water by which one acquires a habit of not only making the right strokes but also of making the right combination of strokes.

With these and other objects in view, which will more fully appear hereinafter, the invention consists in the novel construction and arrangement of parts hereinafter described and shown and particularly pointed out in the appended claims.

Figure 3:
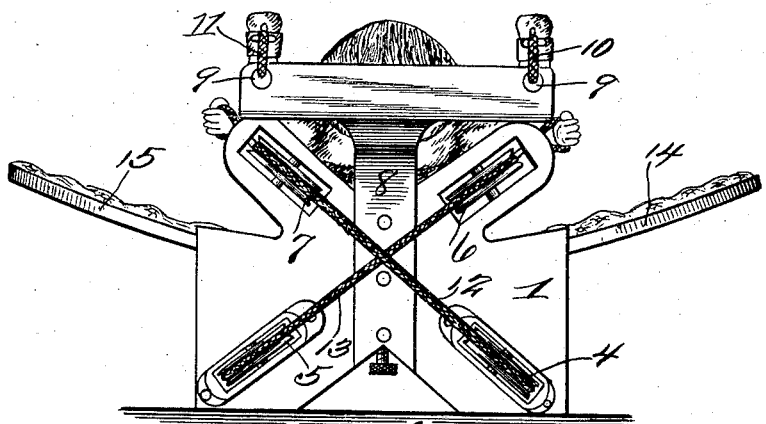
Figure 4:
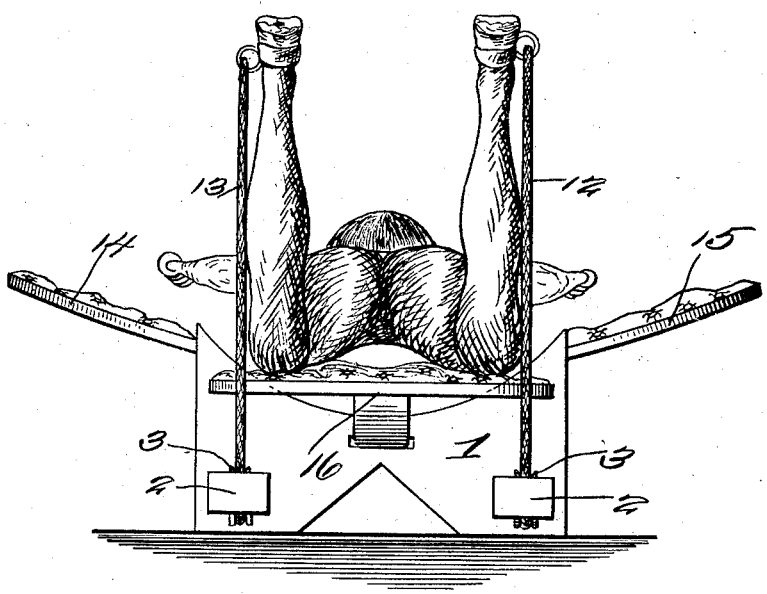

Figure 1 is a side elevation of a device for teaching swimming, showing the operator in position. Fig. 2 is a top plan view. Fig. 3 is an end view. Fig. 4 is a rear view. Fig. 5 is an inverted plan view. Fig. 6 is a vertical longitudinal sectional view.

Referring to the drawings 1 designates an approximately U-shaped frame, having a pair of rearwardly and downwardly projected arms 2 in the ends of which arms are pulleys 3.

The front of the frame 1 is provided with four pulleys 4, 5, 6 and 7. The front of the frame is also provided with a T-shaped support 8 having apertures 9 in each end thereof. The apertures 9 are designed for the reception of ends of elastic cables 10 and 11. The rear ends of these cables are connected to the ankles of the swimming pupil. The swimming pupil has also secured to his wrists cables 12 and 13. The cable 12 is connected with the right wrist of the swimmer and passes over pulleys 4 and 7 over to his left side, thence rearwardly over the pulley 3 and thence connects with his left ankle. By this arrangement it will be seen that when he makes outward horizontal stroke with his right arm the operation of the cable 12 draws his left foot downward, likewise when his left arm operates a downward movement of the right leg is effected. Also when the arms are operated simultaneously the legs are also moved downwardly.

Projecting outwardly on opposite sides of the frame 1 are stops 14 and 15 which are designed for the purpose of preventing the swimmer from using a downward stroke with his arms.

It will be seen that one acquires a habit of making correct strokes in the art of swimming by the use of this machine and it not only removes a necessity of a practical instructor but is so constructed as to permit only the most judicious movements in the art of swimming.

The downward movement of the feet is limited by a stop 16, which is adjustably secured by a screw 16ᵃ to the frame 1.

What is claimed is:—

1. A device for teaching swimming comprising a frame and means for actuating a limb on one side of the swimmer by the operation of the limb on the opposite side.

2. In a device for teaching swimming, a frame, front and rear pulleys, a cable connected with one arm and adapted to actuate a leg on the opposite side of said arm.

3. A device for teaching swimming consisting of a frame, a support, elastic cables connected with said support and with the ankles of the operator for restoring the limbs of said operator to their initial position, cables connected with the arms of the operator, each of said last named cables being also connected with the leg on the opposite side of said arm, means for preventing a downward stroke of said arm and means for limiting the downward stroke of the legs of said operator.

In testimony whereof I have signed my name to this specification in the presence of two subscribing witnesses.

CHARLES G. SICKELS.

Witnesses:
GEO. W. HAWES,
HATTIE MATHEWS.